US012641669B2

(12) United States Patent
Sun et al.

(10) Patent No.: US 12,641,669 B2
(45) Date of Patent: May 26, 2026

(54) SYSTEMS AND METHODS FOR DYNAMIC NETWORK KEEP-ALIVE

(71) Applicant: Beken Corporation, Shanghai (CN)

(72) Inventors: Qiang Sun, Shanghai (CN); Xiangdong Wang, Shanghai (CN); Yin Wang, Shanghai (CN); Xueli Lyu, Shanghai (CN)

(73) Assignee: Beken Corporation, Shanghai (CN)

( * ) Notice: Subject to any disclaimer, the term of this patent is extended or adjusted under 35 U.S.C. 154(b) by 473 days.

(21) Appl. No.: 18/451,703

(22) Filed: Aug. 17, 2023

(65) Prior Publication Data

US 2025/0056648 A1 Feb. 13, 2025

(30) Foreign Application Priority Data

Aug. 9, 2023 (CN) .......................... 202311001921.5

(51) Int. Cl.
*H04W 76/25* (2018.01)

(52) U.S. Cl.
CPC .................................... *H04W 76/25* (2018.02)

(58) Field of Classification Search
None
See application file for complete search history.

(56) References Cited

U.S. PATENT DOCUMENTS

2007/0263662 A1* 11/2007 Akamatsu .......... H04N 21/4405
348/E7.06
2010/0218198 A1* 8/2010 Ruan ..................... G06F 13/387
719/327

2013/0007484 A1* 1/2013 Gobriel ................. G06F 1/3287
713/320
2014/0056313 A1* 2/2014 Wada ...................... H04L 67/55
370/463
2014/0068038 A1* 3/2014 Brook ................. H04L 65/1083
709/223
2014/0115150 A1* 4/2014 Ewanchuk ............ H04L 67/145
709/224
2014/0169338 A1* 6/2014 Bajko ................... H04W 72/23
370/336
2020/0084721 A1* 3/2020 Moner Poy ....... H04W 52/0206

OTHER PUBLICATIONS

Author Unknown, WiFi Deauthentication Frame Explained, pp. 1-11, Jan. 23 (Year: 2022).*
Kai-Hsiu Chen and Jyh-Cheng Chen, Improving Service Availability in 3GPP Generic Access Network (GAN) by Adaptive Keep-alive Interval (AKI), pp. 1-6 (Year: 2010).*

* cited by examiner

*Primary Examiner* — Christopher M Crutchfield
(74) *Attorney, Agent, or Firm* — Schwegman Lundberg & Woessner, P.A.

(57) ABSTRACT

Methods and systems for dynamic network keep-alive are described. In one embodiment, the method comprises establishing a link with an access point, determining a client station time interval and iteratively adjusting the duration of the client station time interval to approximate the access point time interval until the client station time interval is a close approximation of the access point time interval, thereby performing the keep-alive process at an efficient manner.

18 Claims, 10 Drawing Sheets

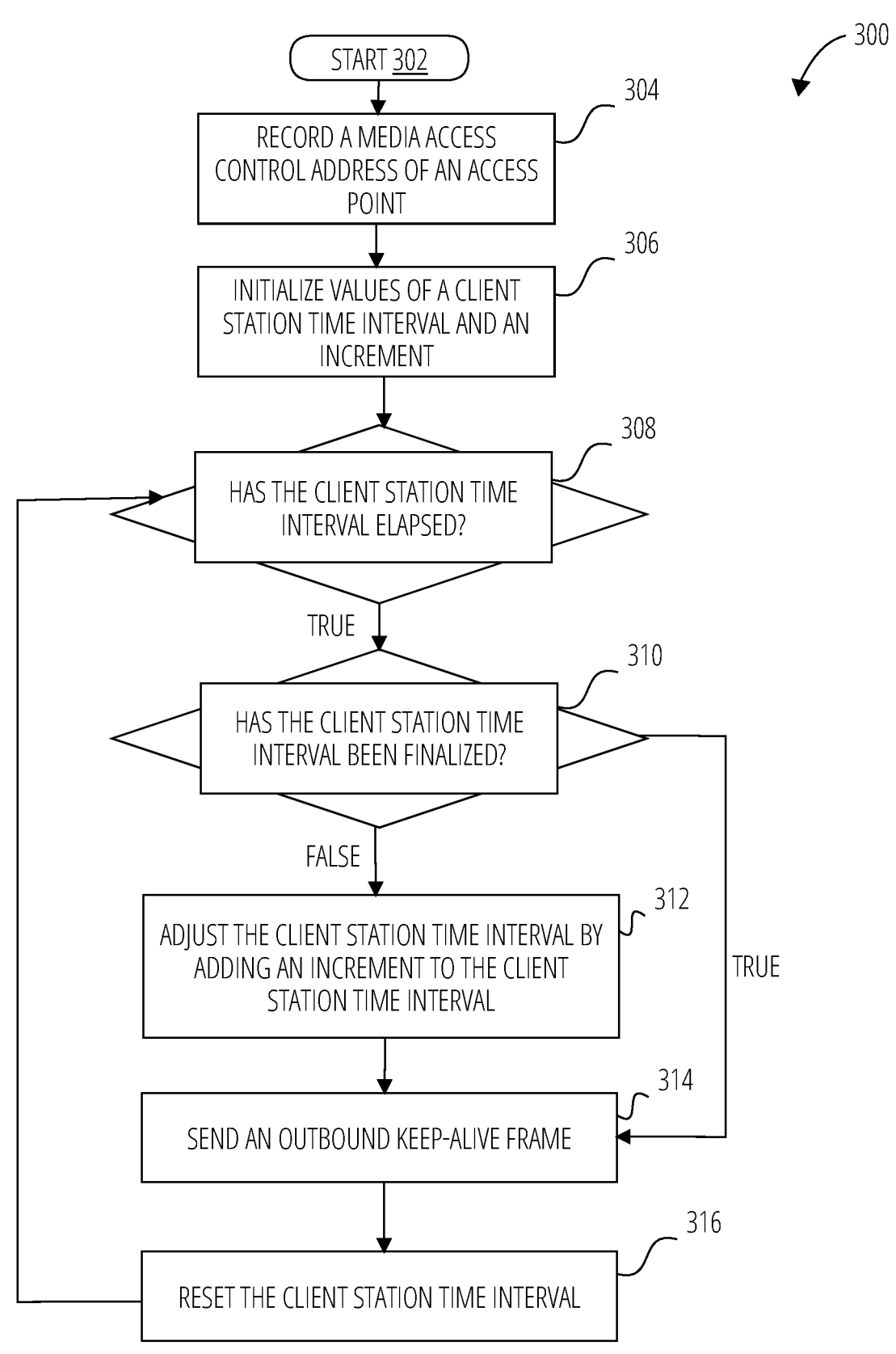

300

START 302

304
RECORD A MEDIA ACCESS
CONTROL ADDRESS OF AN ACCESS
POINT

306
INITIALIZE VALUES OF A CLIENT
STATION TIME INTERVAL AND AN
INCREMENT

308
HAS THE CLIENT STATION TIME
INTERVAL ELAPSED?

TRUE

310
HAS THE CLIENT STATION TIME
INTERVAL BEEN FINALIZED?

FALSE

312
ADJUST THE CLIENT STATION TIME INTERVAL BY
ADDING AN INCREMENT TO THE CLIENT
STATION TIME INTERVAL

TRUE

314
SEND AN OUTBOUND KEEP-ALIVE FRAME

316
RESET THE CLIENT STATION TIME INTERVAL

FIG. 3A

SYSTEMS AND METHODS FOR DYNAMIC NETWORK KEEP-ALIVE

CROSS REFERENCE TO RELATED APPLICATION

This application claims priority to and incorporates by reference Chinese patent application no. 202311001921.5 filed 9 Aug. 2023.

TECHNICAL FIELD

The technical field of the present disclosure generally relates to wireless communications, and more specifically, it relates to a dynamic keep-alive system and methods for maintaining connections among devices within a network.

BACKGROUND

In a wireless network, when there is an extended period of inactivity between the client station and the access point, it becomes necessary to maintain the connection using a keep-alive process. The client station might transmit a frame after a predetermined duration to inform the access point that it is still online. However, if the predetermined duration is too short, it results in high power consumption for the client station. Conversely, if the predetermined duration is longer than the access point's disconnection threshold, it could lead to frequent disconnections. As a result, determining an appropriate frequency of the keep-alive process has become an important issue to address.

BRIEF SUMMARY

The dynamic keep-alive method involves using a hardware processor to establish a link with the access point, initialize a client station time interval and an increment, iteratively add the increment to the client station time interval until a finalized interval is determined, and transmit an outbound keep-alive frame to the access point to maintain the connection.

In an embodiment, a computing apparatus comprising a processor and memory storing instructions that, when executed, configure the apparatus to perform these steps.

In another embodiment, a non-transitory computer-readable storage medium containing instructions that, when executed by a computer, causes the computer to perform these steps.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 3A-3C are flowcharts illustrating operations of a client station 104 in performing method 300 for adaptive network keep-alive, according to some examples.

DETAILED DESCRIPTION

Figure 1:
FIG. 1 is a conceptual diagram illustrating a network system 100, according to one example.
Figure 1:
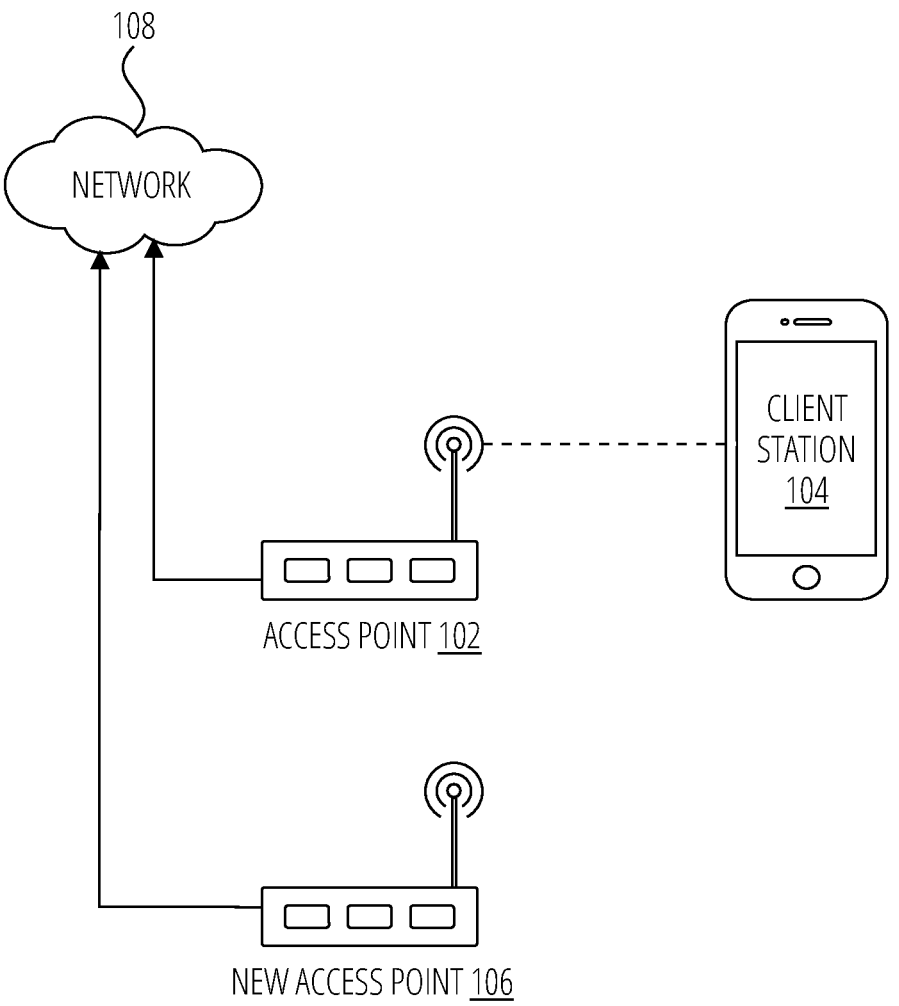

FIG. 1 is a conceptual diagram illustrating a network system 100, which comprises an access point 102, a client station 104, a new access point 106, and a network 108. The network system 100 represents a configuration of devices and connections within a wireless communication environment.

The access point 102 is connected to the network 108, serving as an intermediary between the network and wireless devices, such as the client station 104. The client station 104 can be included in a device like a smartphone or a laptop. The client station 104 wirelessly connects to the network 108 through the access point 102. This connection enables the client station 104 to access network resources, communicate with other devices, and exchange data.

The new access point 106 is also connected to the network 108, providing an additional point of connection for wireless devices within the network system 100.

Figure 2:
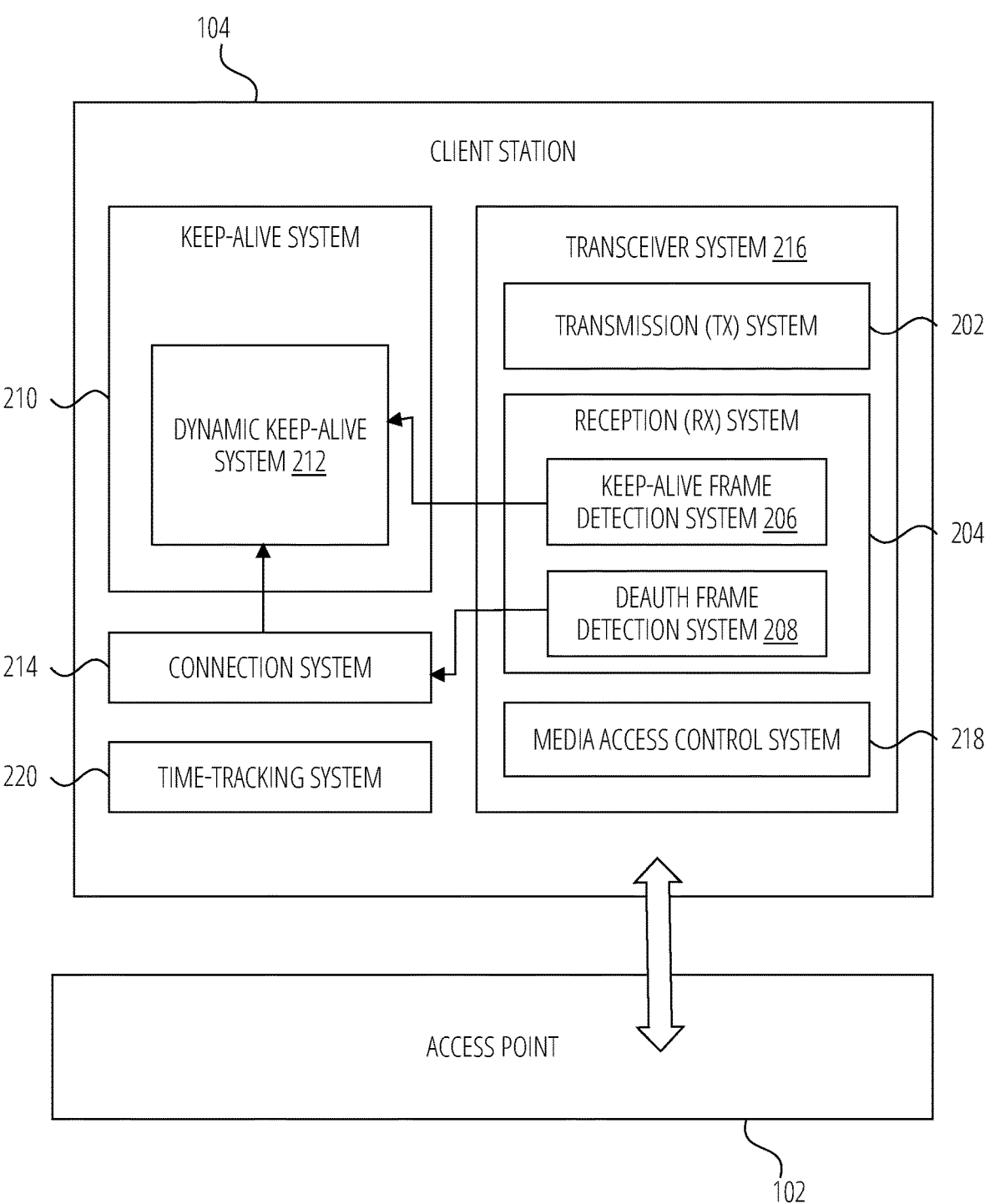
FIG. 2 is a block diagram illustrating further details regarding the network system 100, according to some examples.

FIG. 2 is a block diagram illustrating further details regarding the network system 100, according to some examples. Specifically, the network system 100 is shown to comprise the client station 104 and the access point 102. The network system 100 embodies multiple subsystems. A subsystem may have components that enable it to operate independently and communicate with other services. Each subsystem may be responsible for its own data storage, which may be in the form of a database, cache, or other storage mechanism. This enables a subsystem to operate independently of other systems of the network system 100. Each subsystem may find and communicate with other subsystems of the network system 100.

Example subsystems are discussed below.

A transceiver system 216 is responsible for enabling communication and interaction within the network system 100 and includes a transmission (TX) system 202, a reception (RX) system 204, and a media access control system 218.

The transmission (TX) system 202 is operationally responsible for transmitting radio signals (e.g., frames). In one example, the transmission (TX) system 202 transmits an acknowledge frame to the access point to indicate that the client station 104 acknowledges that the access point is active.

The reception (RX) system 204 is responsible for receiving radio signals (e.g., frames). In one example, the reception (RX) system 204 receives an inbound keep-alive frame transmitted by the access point. Based on receiving the inbound keep-alive frame, the client station 104 is informed of the access point being active, thereby maintaining the connection between the client station 104 and the access point.

The media access control system 218 is responsible for managing media access control (MAC) addresses such as presenting a media access control (MAC) address, identifying media access control (MAC) addresses associated with other devices, and storing the media access control (MAC) addresses in a storage unit (e.g., storage unit 520).

A keep-alive frame detection system 206 is operationally responsible for detecting inbound keep-alive frames. The inbound keep-alive frames are used to maintain the communication links between the client station 104 and other devices within the network system 100.

A deauth frame detection system 208 is operationally responsible for detecting deauthentication (deauth) frames. In response to detecting a deauth frame, the deauth frame detection system 208 may send the deauth frame to the connection system 214 for further processing. The deauth frame detection system 208 may also identify a reason code associated with the deauth frame and determine the reason for disconnection. In one example, determines that the reason for disconnection is related to inactivity based on the reason code.

A keep-alive systems 210 is responsible for maintaining a connection between access points (e.g., access point 102) and the client station 104. In one example, the keep-alive system 210 generates and transmits an outbound keep-alive frame to the access point 102 through the transmission (TX) system 202. The outbound keep-alive frame is used to indicate to the access point 102 that the client station 104 is active, thereby maintaining the connection and communication link between client station 104 and the access point 102. In one example, the keep-alive system 210 sends the outbound keep-alive frame to the access point 102 at the end of the client station time interval.

A dynamic keep-alive system 212 is responsible for iteratively adjusting the transmission frequency of the outbound keep-alive frames by adjusting the duration of the client station time interval until the client station time interval is finalized, that is, when the client station time interval is a close approximation of the access point time interval, thereby ensuring optimal communication efficiency within the network system 100. The dynamic keep-alive system 212 may initialize a client station time interval and an increment. The dynamic keep-alive system 212 may also be operationally responsible for determining whether the client station time interval has been finalized based on the duration of the client station time interval, data inputs from either the keep-alive frame detection system 206 or the connection system 214, and time values provided by a time-tracking system 220.

A connection system 214 is responsible for establishing, re-establishing, breaking, and maintaining connections between devices within the network system 100. In one example, the connection system 214 receives the deauth frame from the deauth frame detection system 208, the connection system 214 attempts to reconnect with an access point in response to receiving the deauth frame, which indicates that the connection is broken. The connection system 214 may also send information to other systems for further processing of the information. For example, the connection system 214 sends the deauth frame received from the deauth frame detection system 208 to the dynamic keep-alive system 212 for further processing (e.g., determining whether the client station time interval has been finalized).

A time-tracking system 220 is responsible for timekeeping within the network system 100. The time-tracking system 220 may keep track of one or more time intervals (e.g., client station time interval, finalized client station time interval, previous client station time interval) and detect whether the one or more time intervals have elapsed. The intervals have elapsed when a specified duration passing or being completed. For example, the time-tracking system 220 determines that the client station time interval has elapsed in response to a specified duration of the client station time interval has occurred from the starting point to the endpoint. In a specific example, the client station time interval is 20 seconds, and the client station time interval is determined to have elapsed when 20 seconds have passed since the client station time interval was reset. In another embodiment, the time-tracking system 220 uses timestamps for tracking the elapse of client station time intervals. Using the previous example in which the client station time interval is 20 seconds, when the client station time interval is reset, the timestamp is recorded at 13:35:00 and the client station time interval would be elapsed at 13:35:20.

In an example, the time-tracking system 220 may be responsible for resetting one or more timers tracking the multiple time intervals. Referring to the example in which the client station time interval has been adjusted to 25 seconds from 20 seconds, and in response to resetting the client station time interval, the time-tracking system 220 resets the client station time interval to 25 seconds. The time-tracking system 220 may start the countdown upon resetting the client station time interval. For example, the time-tracking system 220 resets the finalized client station time interval in response to the time in the finalized client station time interval runs out. In another example, the time-tracking system 220 resets all the client station time intervals in response to the reception (RX) system 204 detecting a unicast communication between the access point 102 and the client station 104.

In another example, the time-tracking system 220 may record the time value when an event happens. For example, the time-tracking system 220 records the time value in response to the keep-alive frame detection system 206 detects that an inbound keep-alive frame is received.

In an additional example, the time-tracking system 220 may ensure that devices within the network system 100 start a keep-alive cycle simultaneously, despite the devices within the network system 100 possessing different time values in their internal clocks.

Figure 3B:
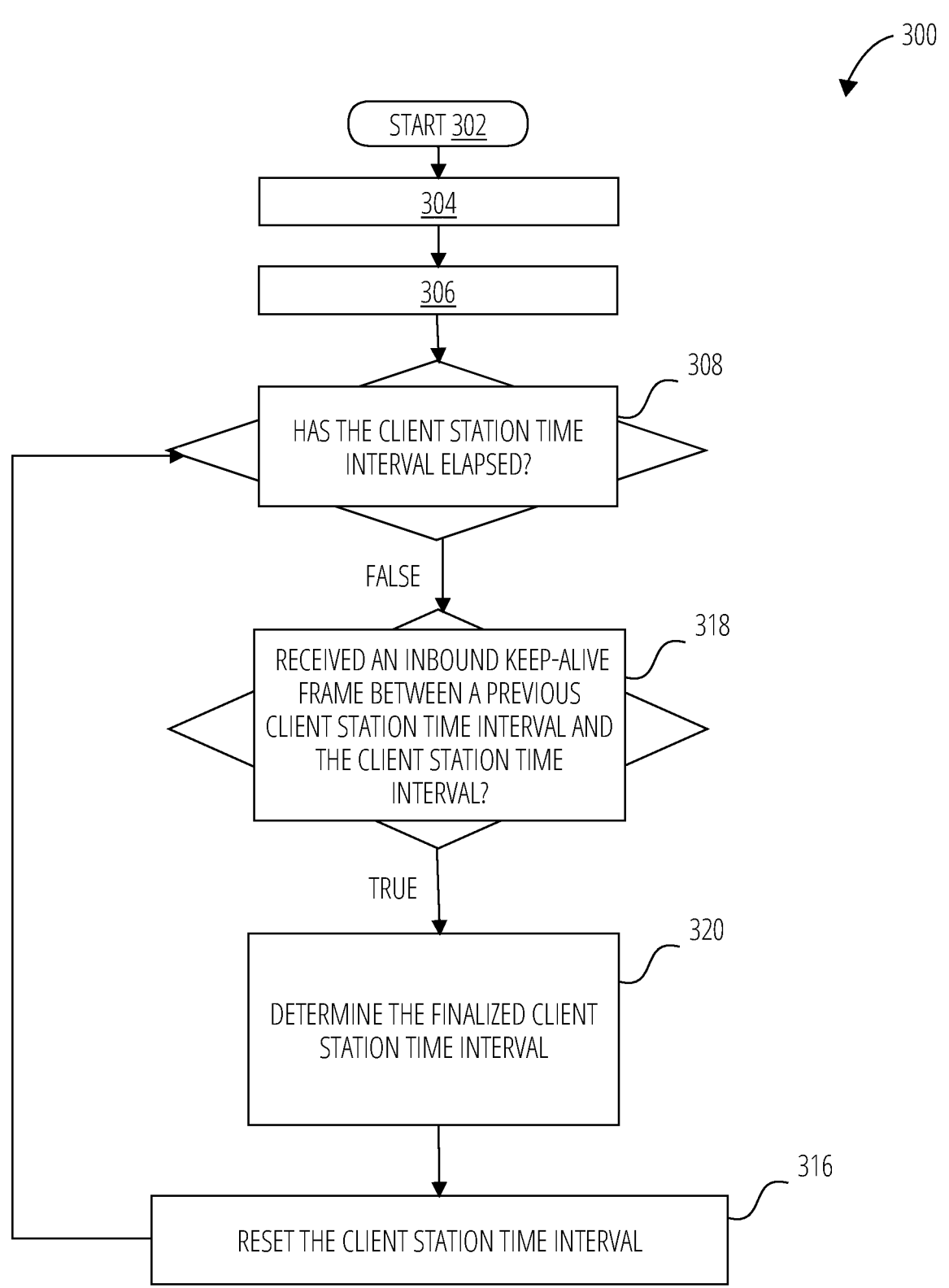
Figure 3C:
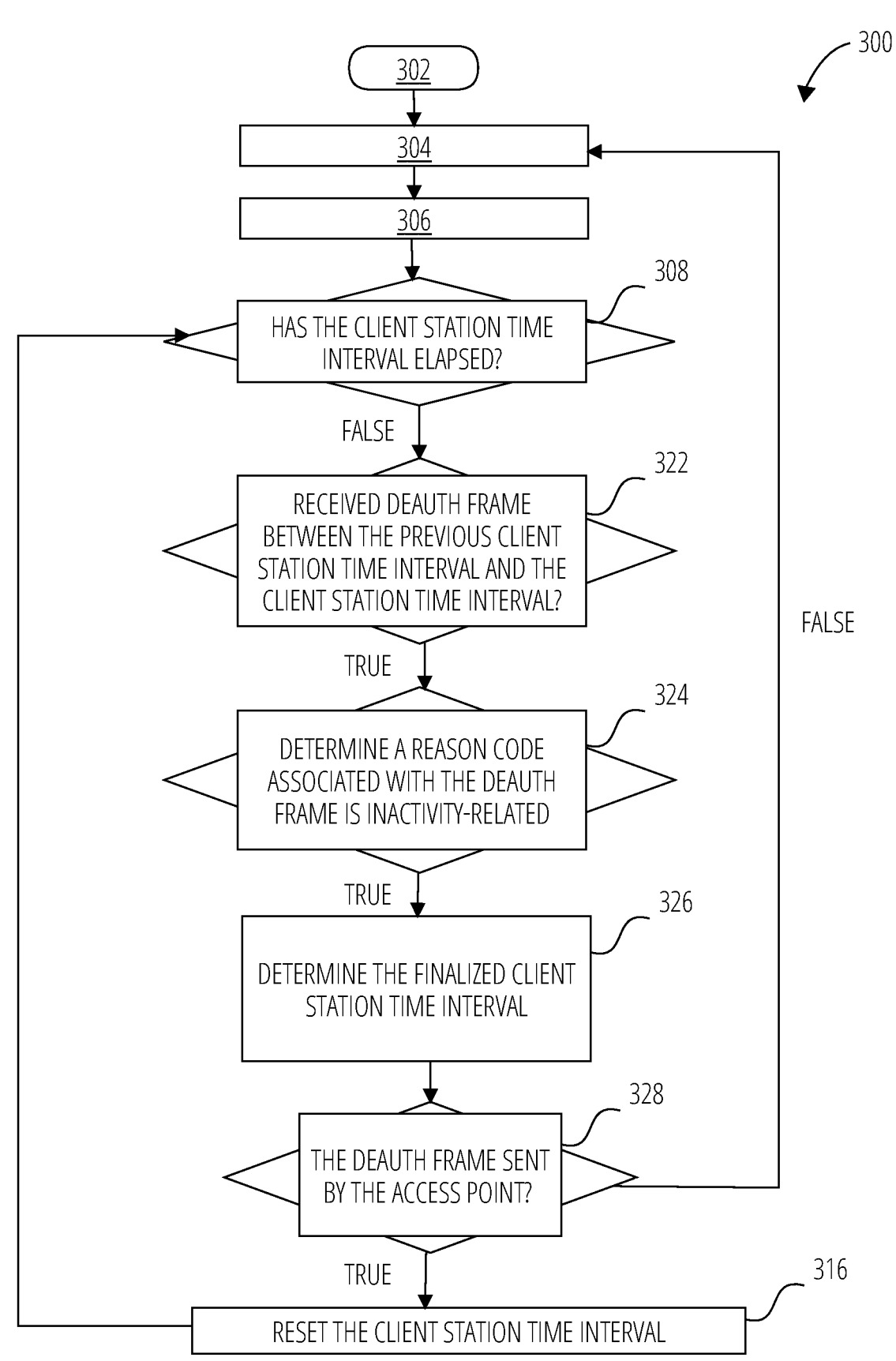

FIGS. 3A-3C are flowcharts illustrating operations of the client station 104 in performing method 300 for dynamic network keep-alive, according to some embodiments. The method 300 may be embodied in computer-readable instructions for execution by one or more processors such that operations of the method 300 may be performed in part or in whole by the functional components of the client station 104; accordingly, the method 300 is described below by way of example with reference thereto. However, it shall be appreciated that at least some of the operations of the method 300 may be deployed on various other hardware configurations than the client station 104.

At operation 302, the method 300 starts.

At operation 304, the client station 104 identifies and records a media access control address of an access point 102. The media access control address (MAC address) is a unique identifier assigned to the access point 102. The client station 104 may store the media access control address in a storage unit 520.

At operation 306, the client station 104 initializes a client station time interval and an increment. The client station time interval may be used as an approximation of the access point time interval. The initial duration of the client station time interval may be predetermined and served as an initial approximation of the access point time interval. In one example, the client station 104 initializes a duration of the client station time interval to be 20 seconds, and the increment is initialized to be 5 seconds.

At operation 308, the client station 104 determines whether the client station time interval has elapsed. The client station 104 may utilize the time-tracking system 220 to monitor the client station time interval. If the client station 104 determines that the client station time interval has elapsed (i.e., returning "TRUE"), it proceeds to operation 310. Refer to descriptions to FIGS. 3B and 3C for operations to be performed in response to determining that the client station time interval has not elapsed (i.e., returning "FALSE").

At operation 310, the client station 104 determines whether the client station time interval has been finalized. In one example, the client station time interval may be determined to be finalized in response to determining a finalized client station time interval. The finalized client station time interval is in close approximation of the access point time interval. In one example, the finalized client station time interval is in close approximation of the access point time interval when the finalized client station time interval is less than or equal to one increment shorter than the access point time interval (i.e., access point time interval–increment≤finalized client station time interval≤access point time interval). In another example, the client station 104 determines that the client station time interval is finalized based on the client station time interval has been flagged to be "finalized" to indicate that the client station time interval is now in close approximation to the access point time interval. In the embodiment illustrated in FIG. 3A, if the client station 104 determines that the client station time interval has not been finalized (i.e., returning "FALSE"), it proceeds to operation 312. If the client station 104 determines that the client station time interval has been finalized (i.e., returning "TRUE"), it proceeds to operation 314.

At operation 312, the client station 104 adjusts the client station time interval by adding an increment to the client station time interval. For example, the current duration of the client station time interval is 20 seconds, and the increment is 5 seconds. The client station 104 adds 5 seconds to the client station time interval, resulting in an adjusted duration of 25 seconds. In the following iterative cycle, the 25-second duration becomes the current duration of the client station time interval and prior 20-second duration becomes the previous client station time interval. Additionally, the client station 104 may keep track of past durations of the client station time interval. In one example, the client station 104 stores in a variable named previous client station time interval, which keeps the duration of the client station time interval before the increment is added. In the given example, after client station time interval is adjusted to be 25 seconds, and the previous client station time interval holds the value of 20 seconds.

At operation 314, the client station 104 sends an outbound keep-alive frame. The outbound keep-alive frame may be a type of frame to be sent to inform the receiving device that the connection is still active, even if there is no data to be transmitted. In one example, the outbound keep-alive frame may be a null frame in the IEEE 802.11 Wi-Fi® standard, designed to serve purposes such as maintain a connection or performing power management. The client station 104 sends the outbound keep-alive frame to the access point to ensure that the connection between the client station 104 and the access point remains active and does not drop due to inactivity.

At operation 316, the client station 104 resets the client station time interval. In one example, the client station 104 utilizes the time-tracking system 220 to reset the time value of the client station time interval. Completion of operation

316 may signifies the end of an iterative cycle, and the following iterative cycles commencing from operation 308.

As shown in FIG. 3B, the method 300 may, in some embodiments, further comprise operations 318 and 320. Operation 318 may be performed in response to the client station 104 determining that the client station time interval has not elapsed (i.e., operation 308 returning "FALSE").

At operation 318, the client station 104 determines whether an inbound keep-alive frame is received between a previous client station time interval and the client station time interval (i.e., after expiration of the previous client station time interval and before the expiration of the client station time interval). Receiving the inbound keep-alive frame from the access point between the previous client station time interval and the client station time interval indicates that the access point time interval is shorter than the client station time interval because the access point would transmit the inbound keep-alive frame in response to the expiration of the access point time interval, and the receipt of the inbound keep-alive frame is an indication that the access point time interval has elapsed before the client station time interval does.

In one example, the client station 104 may perform operation 318 more than once to verify that the access point time interval is, in fact, shorter than the client station time interval. To accomplish this, the client station 104 proceeds to operation 316 to reset the client station time interval. Concurrently, the access point time interval is reset in response to transmitting the inbound keep-alive frame to the client station 104, resulting in the concurrent resetting of both the access point time interval and the client station time interval. Operations 308 and 318 are subsequently followed in response to the resetting of the client station time interval. In response to receiving a subsequent inbound keep-alive frame from the access point 102 between the previous client station time interval and the client station time interval, the client station 104 may confirm that the access point time interval is indeed longer than the previous client station time interval but shorter than the client station time interval.

At operation 320, the client station 104 determines the finalized client station time interval based on determining that the inbound keep-alive frame is received between the previous client station time interval and the client station time interval (i.e., operation 318 returning "TRUE"), indicating that the access point time interval is shorter than the client station time interval as explained above. In one example, the client station 104 determines the finalized client station time interval by subtracting the increment from the client station time interval (i.e., the finalized client station time interval=the client station time interval-increment). In another example, the client station 104 determines the finalized client station time interval by setting it equal to the previous client station time interval without performing the subtraction. The finalized client station time interval is deemed in a close approximation to the access point time interval (e.g., the access point time interval is within one increment shorter than the client station time interval) and therefore the client station time interval is finalized. In one example, the client station 104 flags the client station time interval as finalized. Operation 320 may be performed by either the keep-alive frame detection system 206 or the dynamic keep-alive system 212.

As shown in FIG. 3C, the method 300 may, in some embodiments, further comprise operations 322, 324, 326, and 328. The operations 322 may be performed in response to the client station 104 determining that the client station time interval has not elapsed (i.e., operation 308 returning "FALSE").

At operation 322, the client station 104 determines whether a deauthentication (deauth) frame is received between the previous client station time interval and the client station time interval (i.e., after expiration of the previous client station time interval and before the expiration of the client station time interval). Receiving the deauth frame from the access point between the previous client station time interval and the client station time interval may indicate that the access point time interval is shorter than the client station time interval because the deauth frame may be used by the access point to notify the receiving device (i.e., client station) that it is being disassociated from the network due to inactivity in the duration of the access point time interval. The access point transmits the deauth frame in response to the expiration of the access point time interval, so the receipt of the deauth frame is an indication that the access point time interval has elapsed before the client station time interval does.

At operation 324, the client station 104 determines a reason code associated with the deauth frame being related to inactivity. This determination is made to confirm that the transmission of the deauth frame results from inactivity within the duration of the access point time interval, rather than other causes such as security-related reasons or normal network disconnection processes. In one example, the reason code associated with the deauth frame is a 2-byte field that specifies the reason for the deauthentication, as defined in the IEEE 802.11 Wi-Fi® standard. In another example, the client station 104 determines that the reason code associated with the deauth frame is related to inactivity based on the reason code being a Reason code 4, corresponding to REASON_INACTIVITY, the meaning of which is "disassociated due to inactivity," in accordance with IEEE 802.11 Wi-Fi® standard.

At operation 326, the client station 104 determines the finalized client station time interval based on determining that the deauth frame is received between the previous client station time interval and the client station time interval and the reason code associated with the deauth frame is related to inactivity (i.e., both operations 322 and 324 return TRUE), indicating the access point time interval is shorter than the client station time interval. In one example, the client station 104 determines the finalized client station time interval by subtracting the increment from the client station time interval (i.e., the client station time interval=the client station time interval–increment) and therefore, the client station time interval is finalized. In another example, the client station 104 determines the finalized client station time interval by setting it equal to the previous client station time interval. The finalized client station time interval is deemed to be a close approximation of the access point time interval (e.g., the access point time interval is within one increment shorter than the client station time interval), hence, the client station time interval is finalized. In one example, the client station 104 flags the client station time interval as finalized. Operation 326 may be performed by one or more of the deauth frame detection system 208, the connection system 214, and the dynamic keep-alive system 212.

At operation 328, the client station 104 determines whether the deauth frame was sent by the access point. This determination is accomplished by comparing the media access control addresses recorded in operation 304 and a media access control address associated with the deauth frame. Based on the media access control address matches the media access control address associated with the deauth frame, the client station 104 determines that the deauth frame is sent by the access point. The client station 104 proceeds to operation 316 to reset the client station time interval. Subsequently, the client station 104 performs an operation (not shown in the drawing) to re-establish a connection between the client station 104 and the access point. Alternatively, based on the media access control address recorded in operation 304 is different from the media access control address associated with the deauth frame, the client station 104 determines that the deauth frame is not transmitted by the access point, but rather, by a new access point. Consequently, the client station 104 proceeds to operation 304 to record a media access control address associated with the new access point, indicating that the client station 104 is currently connected to the new access point. The new access point will henceforth function as the access point for purposes of performing method 300. The client station time interval is un-finalized in response to determining the client station 104 is connected to the new access point and the finalized client station time interval is to be determined.

Figure 4A:
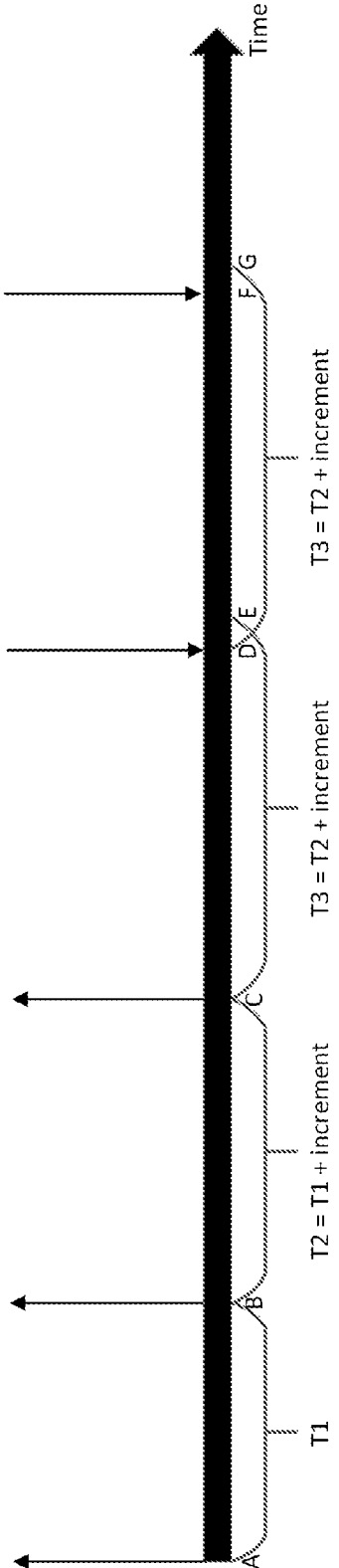
FIGS. 4A-4C are conceptual diagrams illustrating the iterative cycles of performing dynamic network keep-alive on a timeline, according to some examples.
Figure 4B:
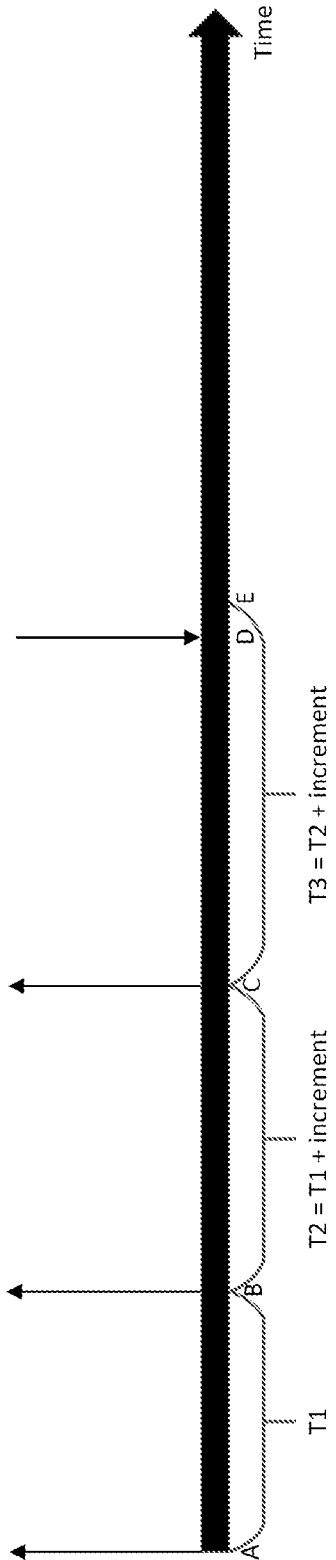
Figure 4C:
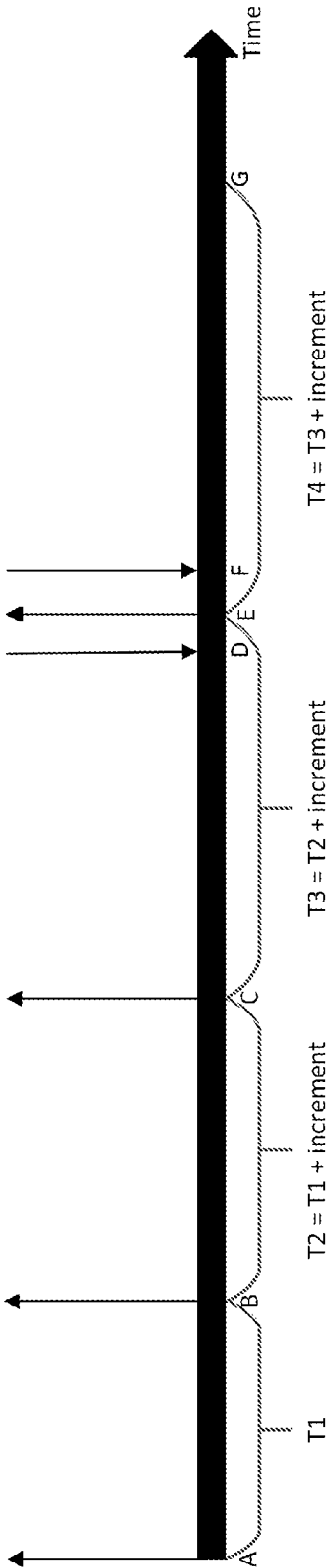

FIGS. 4A-4C are conceptual diagrams illustrating the iterative cycles of performing dynamic network keep-alive on a timeline, according to some embodiments.

FIG. 4A presents the timeline with multiple points in time, point A through point E, representing time values of a clock, a timer, or a stopwatch. FIG. 4A also presents multiple durations of the client station time interval, denoted by T1, T2, and T3. T1 denotes the initial duration of the client station time interval; T2 denotes a duration after adding an increment to the initial duration of the client station time interval (i.e., T2=T1+increment). T3 denotes a duration of the client station time interval after adding another increment to T2 (i.e., T3=T2+increment). Tn would represent the duration T1+n×increment.

The first iterative cycle initiates at point A and ends at point B. In the first iterative cycle, the client station time interval is T1. Prior to point A, the client station 104 establishes a connection to the access point, creating a link between the client station 104 and the access point 102. Between point A and point B, the client station 104 determines that the client station time interval has not been finalized. The client station 104 adjusts the client station time interval by adding the increment to T1, obtaining T2. To maintain the connection, the client station 104 sends an outbound keep-alive frame to the access point when T1 has elapsed (i.e., at point B). In one example, the client station 104 determines that the link is still active, the client station time interval has not been finalized, and the finalized client station time interval remains to be determined based on receiving an acknowledge frame from the access point after sending the outbound keep-alive frame. In another example, the client station 104 reverts the client station time interval to the previous client station time interval (i.e., T1), based on not receiving a response from the access point after sending the outbound keep-alive frame.

The second iterative cycle initiates at point B and ends at point C. At point B, the client station 104 resets the client station time interval. Between point B and point C, the client station 104 determines that the client station time interval has not been finalized. The client station 104 adjusts the client station time interval again by adding the increment, obtaining T3. To maintain the link, the client station 104 sends a subsequent outbound keep-alive frame to the access point when T2 elapsed (i.e., at point C). In one example, the client station 104 determines that the link is still active based on receiving an acknowledge frame from the access point after sending the outbound keep-alive frame. In another example, the client station 104 reverts the client station time interval to the previous client station time interval (i.e., T2), based on not receiving a response from the access point after sending the subsequent outbound keep-alive frame.

The third iterative cycle initiates at point C and ends at point D. At point C, the client station 104 resets the client station time interval. In one example, after the duration of T2 has elapsed but before T3 elapses at point E, the client station 104 receives an inbound keep-alive frame from the access point, indicating that the access point time interval may be longer than T2 but shorter than T3. The client station 104 determines the finalized client station time interval by subtracting the increment from the client station time interval. In another example, based on receiving the inbound keep-alive frame after the duration of T2 has elapsed but before T3 elapses, the client station 104 determines the finalized client station time interval is T2 without performing any calculation.

In one example, in response to receiving the inbound keep-alive frame from the access point before T3 elapses, the client station 104 attempts to verify that the client station time interval (i.e., T3) is indeed longer than the access point time interval by waiting another T3 before sending the outbound keep-alive frame. To do that, the client station 104 resets the client station time interval at point D. At point F, before the end of T3 (i.e., at point G), the client station 104 receives a subsequent inbound keep-alive frame from the access point, confirming that the current client station time interval (i.e., T3) is indeed longer than the access point time interval. The client station 104 determines that the client station time interval is finalized and a finalized client station time interval is T2.

FIG. 4B presents another example of the iterative cycles of performing dynamic network keep-alive on a timeline, according to some examples.

The first iterative cycle initiates at point A and ends at point B. In the first iterative cycle, the client station time interval is T1. Prior to point A, the client station 104 establishes a connection to the access point, creating a link between the client station 104 and the access point. The client station 104 may record the media access control address of the access point. Between point A and point B, the client station 104 determines that the client station time interval has not been finalized. The client station 104 adjusts the client station time interval by adding the increment to T1, obtaining T2. To maintain the connection, the client station 104 sends an outbound keep-alive frame to the access point when T1 has elapsed (i.e., at point B). In one example, the client station 104 determines that the link is still active based on receiving an acknowledge frame from the access point after sending the outbound keep-alive frame. In another example, the client station 104 reverts the client station time interval to the previous client station time interval (i.e., T1), based on not receiving a response from the access point after sending the outbound keep-alive frame.

The second iterative cycle initiates at point B and ends at point C. At point B, the client station 104 resets the client station time interval. Between point B and point C, the client station 104 determines that the client station time interval has not been finalized. The client station 104 adjusts the client station time interval again by adding the increment, obtaining T3. To maintain the link, the client station 104 sends an outbound keep-alive frame to the access point when T2 elapsed (i.e., at point C). In one example, the client station 104 determines that the link is still active based on receiving the acknowledge frame from the access point after sending the outbound keep-alive frame. In another example, the client station 104 reverts the client station time interval to the previous client station time interval (i.e., T2), based on not receiving a response from the access point after sending the outbound keep-alive frame.

The third iterative cycle initiates at point C and ends at point D. At point C, the client station 104 resets the client station time interval. In one example, after the duration of T2 has elapsed but before T3 elapses at point E, the client station receives a deauth frame from the access point (e.g., at point D); the client station 104 determines that a reason code associated with the deauth frame is related to inactivity; and the client station 104 determines the finalized client station time interval to be T2. In one example, the client station 104 determines the finalized client station time interval by subtracting the increment from the client station time interval. In additional examples, the client station 104 determines that the deauth frame was sent by the same access point based on the media access control addresses matches a media access address associated with the deauth frame. The client station 104 resets the client station time interval to the finalized client station time interval (i.e., T2) and continues the iterative cycles.

FIG. 4C presents another example of the iterative cycles of performing dynamic network keep-alive on a timeline, according to some examples.

The first iterative cycle initiates at point A and ends at point B. In the first iterative cycle, the client station time interval is T1. Prior to point A, the client station 104 establishes a connection to the access point, creating a link between the client station 104 and the access point. The client station 104 may record the media access control address of the access point. Between point A and point B, the client station 104 determines that the client station time interval has not been finalized. The client station 104 adjusts the client station time interval by adding the increment to T1, obtaining T2. To maintain the connection, the client station 104 sends an outbound keep-alive frame to the access point when T1 has elapsed (i.e., at point B). In one example, the client station 104 determines that the link is still active based on receiving an acknowledge frame from the access point after sending the outbound keep-alive frame. In another example, the client station 104 reverts the client station time interval to the previous client station time interval (i.e., T1), based on not receiving a response from the access point after sending the subsequent outbound keep-alive frame.

The second iterative cycle initiates at point B and ends at point C. At point B, the client station 104 resets the client station time interval. Between point B and point C, the client station 104 determines that the client station time interval has not been finalized. The client station 104 adjusts the client station time interval again by adding the increment, obtaining T3. To maintain the link, the client station 104 sends an outbound keep-alive frame to the access point when T2 elapsed (i.e., at point C). In one example, the client station 104 determines that the link is still active based on receiving the acknowledge frame from the access point after sending the outbound keep-alive frame. In another example, the client station 104 reverts the client station time interval to the previous client station time interval (i.e., T2), based on not receiving a response from the access point after sending the outbound keep-alive frame.

The third iterative cycle initiates at point C and ends at point E. At point C, the client station 104 resets the client station time interval. Between point C and point E, after the duration of T2 has elapsed but before T3 elapses at point E, the access point sends an inbound keep-alive frame to the client station 104, but the client station 104 fails to receive/detect the inbound keep-alive frame. The client station 104 determines that the client station time interval has not been finalized. The client station 104 adjusts the client station time interval by adding the increment, obtaining T4. To maintain the link, the client station 104 sends an outbound keep-alive frame to the access point when T3 elapsed (i.e., at point E). Before the duration of T3 has passed, the client station 104 receives a deauth frame from the access point. The client station 104 determines that a reason code associated with the deauth frame is related to inactivity; and the client station 104 determines the finalized client station time interval to be T2 based on receiving the deauth frame before the duration of T3 has passed. In one example, the client station 104 determines the finalized client station time interval by setting the client station time interval to T2. In additional examples, the client station 104 determines that the deauth frame was sent by the access point based on the media access control addresses matches a media access address associated with the deauth frame. The client station 104 resets the client station time interval to the finalized client station (i.e., T2) and continues the iterative cycles.

Figure 5:
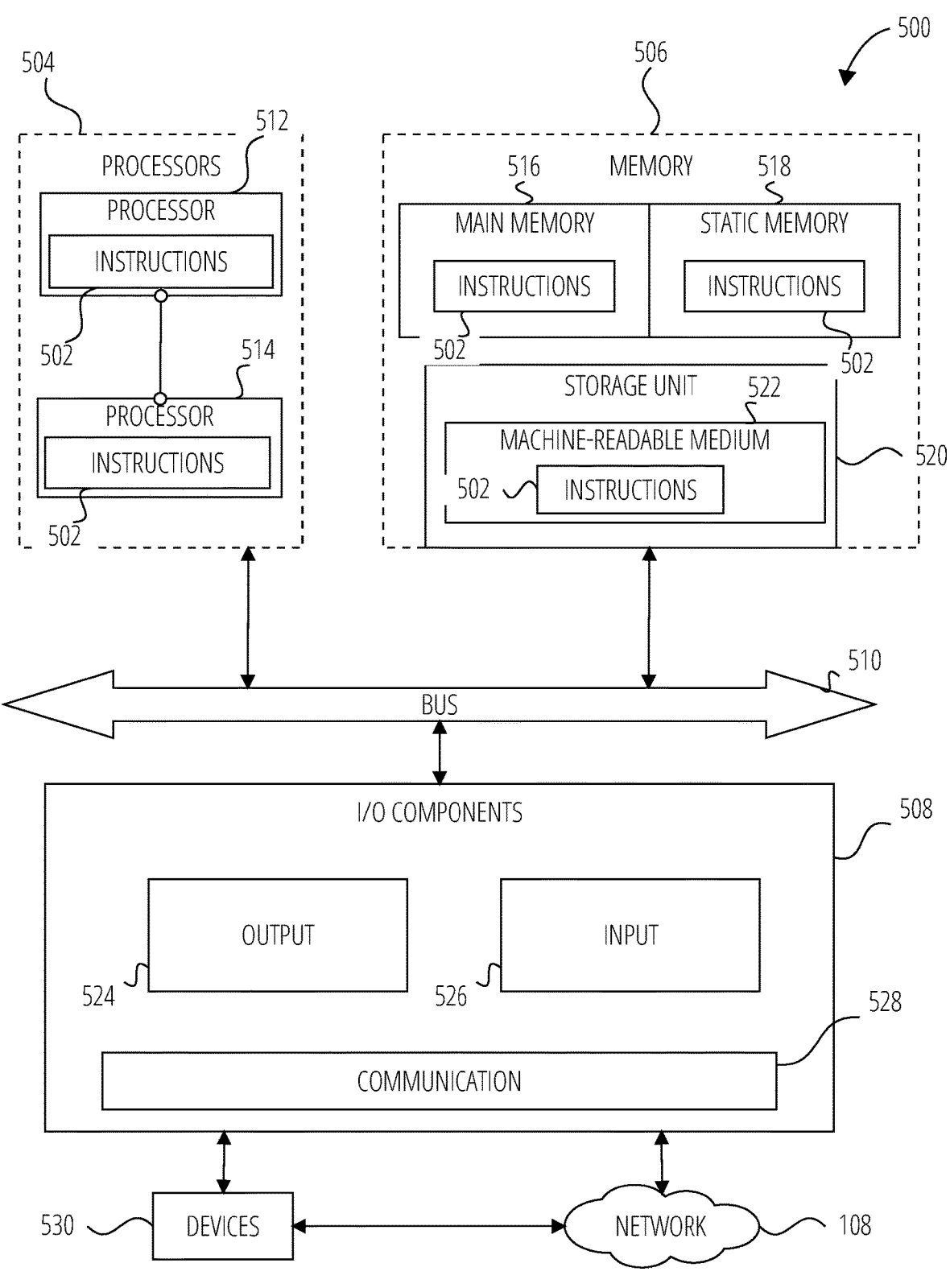
FIG. 5 is a diagrammatic representation of the machine 500 within which instructions 502 for causing the machine 500 to perform any one or more of the methodologies discussed herein may be executed, according to some examples.

FIG. 5 is a diagrammatic representation of the machine 500 within which instructions 502 (e.g., software, a program, an application, an applet, an app, or other executable code) for causing the machine 500 to perform any one or more of the methodologies discussed herein may be executed. For example, the instructions 502 may cause the machine 500 to execute any one or more of the methods described herein. The instructions 502 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 502, sequentially or otherwise, that specify actions to be taken by the machine 500. Further, while a single machine 500 is illustrated, the term "machine" shall also be taken to include a collection of machines that individually or jointly execute the instructions 502 to perform any one or more of the methodologies discussed herein. The machine 500, for example, may comprise the user system 110 or any one of multiple server devices forming part of the interaction server system 110. In some examples, the machine 500 may also comprise both client and server systems, with certain operations of a particular method or algorithm being performed on the server-side and with certain operations of the particular method or algorithm being performed on the client-side.

The machine 500 may include processors 504, memory 506, and input/output (I/O) components 508, which may be configured to communicate with each other via a bus 510. In an example, the processors 504 (e.g., a Central Processing Unit (CPU), a Reduced Instruction Set Computing (RISC)

Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 512 and a processor 514 that execute the instructions 502. The term "processor" is intended to include multi-core processors that may comprise two or more independent processors (sometimes referred to as "cores") that may execute instructions contemporaneously. Although FIG. 5 shows multiple processors 504, the machine 500 may include a single processor with a single-core, a single processor with multiple cores (e.g., a multi-core processor), multiple processors with a single core, multiple processors with multiples cores, or any combination thereof.

The memory 506 includes a main memory 516, a static memory 518, and a storage unit 520, both accessible to the processors 504 via the bus 510. The main memory 516, the static memory 518, and storage unit 520 store the instructions 502 embodying any one or more of the methodologies or functions described herein. The instructions 502 may also reside, completely or partially, within the main memory 516, within the static memory 518, within machine-readable medium 522 within the storage unit 520, within at least one of the processors 504 (e.g., within the processor's cache memory), or any suitable combination thereof, during execution thereof by the machine 500.

The I/O components 508 may include a wide variety of components to receive input, provide output, produce output, transmit information, exchange information, capture measurements, and so on. The specific I/O components 508 that are included in a particular machine will depend on the type of machine. For example, portable machines such as mobile phones may include a touch input device or other such input mechanisms, while a headless server machine will likely not include such a touch input device. It will be appreciated that the I/O components 508 may include many other components that are not shown in FIG. 5. In various examples, the I/O components 508 may include output components 524 and input components 526. The output components 524 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

Communication may be implemented using a wide variety of technologies. The I/O components 508 further include communication components 528 operable to couple the machine 500 to a network 108 or devices 530 via respective coupling or connections. For example, the communication components 528 may include a network interface component or another suitable device to interface with the network 108. In further examples, the communication components 528 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 530 may be another machine or any of a wide variety of peripheral devices (e.g., a peripheral device coupled via a USB).

Moreover, the communication components 528 may detect identifiers or include components operable to detect identifiers. For example, the communication components 528 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 528, such as location via Internet Protocol (IP) geolocation, location via Wi-Fi® signal triangulation, location via detecting an NFC beacon signal that may indicate a particular location, and so forth.

The various memories (e.g., main memory 516, static memory 518, and memory of the processors 504) and storage unit 520 may store one or more sets of instructions and data structures (e.g., software) embodying or used by any one or more of the methodologies or functions described herein. These instructions (e.g., the instructions 502), when executed by processors 504, cause various operations to implement the disclosed examples.

The instructions 502 may be transmitted or received over the network 108, using a transmission medium, via a network interface device (e.g., a network interface component included in the communication components 528) and using any one of several well-known transfer protocols (e.g., hypertext transfer protocol (HTTP)). Similarly, the instructions 502 may be transmitted or received using a transmission medium via a coupling (e.g., a peer-to-peer coupling) to the devices 530.

Figure 6:
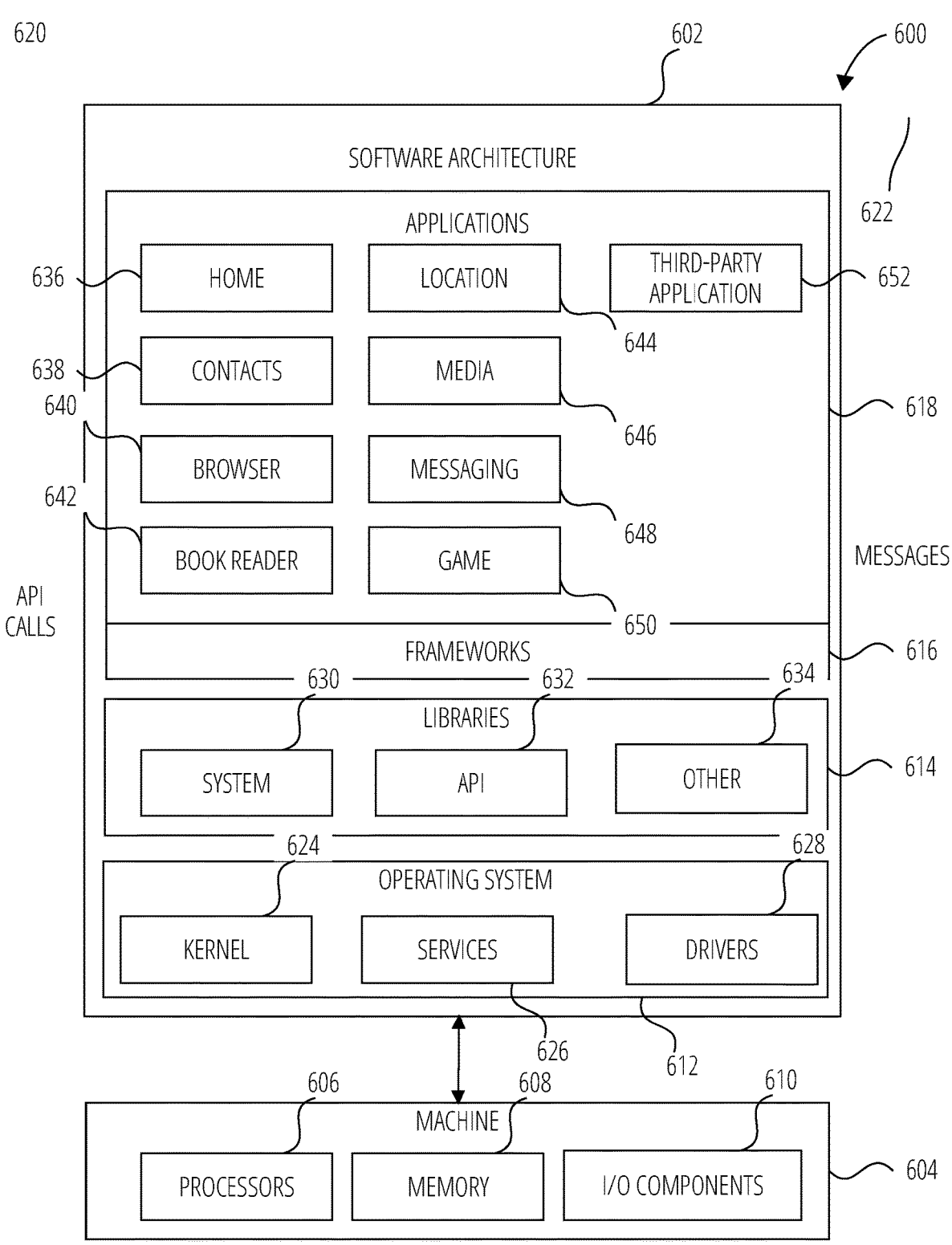
FIG. 6 is a block diagram 600 illustrating a software architecture 602, according to some examples.

FIG. 6 is a block diagram 600 illustrating a software architecture 602, which can be installed on any one or more of the devices described herein. The software architecture 602 is supported by hardware such as a machine 604 that includes processors 606, memory 608, and I/O components 610. In this example, the software architecture 602 can be conceptualized as a stack of layers, where each layer provides a particular functionality. The software architecture 602 includes layers such as an operating system 612, libraries 614, frameworks 616, and applications 618. Operationally, the applications 618 invoke API calls 620 through the software stack and receive messages 622 in response to the API calls 620.

The operating system 612 manages hardware resources and provides common services. The operating system 612 includes, for example, a kernel 624, services 626, and drivers 628. The kernel 624 acts as an abstraction layer between the hardware and the other software layers. For example, the kernel 624 provides memory management, processor management (e.g., scheduling), component management, networking, and security settings, among other functionalities. The services 626 can provide other common services for the other software layers. The drivers 628 are responsible for controlling or interfacing with the underlying hardware. For instance, the drivers 628 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 614 provide a common low-level infrastructure used by the applications 618. The libraries 614 can include system libraries 630 (e.g., C standard library) that provide functions such as memory allocation functions, string manipulation functions, mathematic functions, and the like. In addition, the libraries 614 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 614 can also include a wide variety of other libraries 634 to provide many other APIs to the applications 618.

The frameworks 616 provide a common high-level infrastructure that is used by the applications 618. For example, the frameworks 616 provide various graphical user interface (GUI) functions, high-level resource management, and high-level location services. The frameworks 616 can provide a broad spectrum of other APIs that can be used by the applications 618, some of which may be specific to a particular operating system or platform.

In an example, the applications 618 may include a home application 636, a contacts application 638, a browser application 640, a book reader application 642, a location application 644, a media application 646, a messaging application 648, a game application 650, and a broad assortment of other applications such as a third-party application 652. The applications 618 are programs that execute functions defined in the programs. Various programming languages can be employed to create one or more of the applications 618, structured in a variety of manners, such as object-oriented programming languages (e.g., Objective-C, Java, or C++) or procedural programming languages (e.g., C or assembly language). In a specific example, the third-party application 652 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 652 can invoke the API calls 620 provided by the operating system 612 to facilitate functionalities described herein.

EXAMPLES

Example 1 is a method including establishing, by at least one hardware processor, a link with an access point; initializing, by the at least one hardware processor, a client station time interval and an increment; iteratively adding, by the at least one hardware processor, the increment to the client station time interval until a finalized client station time interval is determined; and causing transmission, by the at least one hardware processor, of an outbound keep-alive frame to the access point in response to the finalized client station time interval having elapsed to maintain a connection to the access point.

In Example 2, the subject matter of Example 1 including receiving an inbound keep-alive frame from the access point between a previous client station time interval and the client station time interval, wherein the previous client station time interval is equal to the client station time interval minus the increment; determining the finalized client station time interval in response to receiving the inbound keep-alive frame from the access point between the previous client station time interval and the client station time interval; and determining the finalized client station time interval to be the previous client station time interval.

In Example 3, the subject matter of Examples 1-2 including receiving a subsequent inbound keep-alive frame from the access point; and confirming an access point time interval being longer than the previous client station time interval but shorter than the client station time interval based on receiving the subsequent inbound keep-alive frame from the access point between the previous client station time interval and the client station time interval.

In Example 4, the subject matter of Examples 1-3 including receiving a deauth frame from the access point between a previous client station time interval and the client station time interval; determining a reason code associated with the deauth frame, the reason code indicates a reason for disconnection between the access point and the client station; and determining a finalized client station time interval in response to both receiving the deauth frame from the access point between the previous client station time interval and the client station time interval and determining that the reason for the disconnection being related to inactivity.

In Example 5, the subject matter of Examples 1~4 including determining a media access control address of the access point; determining a media access control address associated with the deauth frame in response to receiving the deauth frame between the previous client station time interval and the client station time interval; comparing the media access control address of the access point and the media access control address associated with the deauth frame; and based on the media access control address matches with the media access control address associated with the deauth frame, determining the deauth frame is sent by the access point.

In Example 6, the subject matter of Examples 1-5 including determining a media access control address of the access point; determining a media access control address associated with the deauth frame in response to receiving the deauth frame between the previous client station time interval and the client station time interval; comparing the media access control address of the access point and the media access control address associated with the deauth frame; determining the deauth frame being sent by a new access point, the new access point is different from the access point based on the media access control address is different from the media access control address associated with the deauth frame; recording the media access control address associated with the deauth frame as the media access control address of the new access point; and performing the determining the client station time interval, iteratively determining, iteratively adding, and determining the finalized client station time interval recited in claim 1 for the new access point.

In Example 7, the subject matter of Examples 1-6 including causing transmission of an outbound keep-alive frame to the access point after the client station time interval having elapsed; receiving a deauth frame from the access point after the causing transmission of the outbound keep-alive frame but before a previous client station time interval elapses; determining the access point time interval being shorter than the previous client station time interval based on receiving the deauth frame from the access point before the previous client station time interval; and determining the finalized client station time interval to be the previous client station time interval minus the increment.

In Example 8, the subject matter of Examples 1-7 including determining a reason code associated with the deauth frame, the reason code indicates a reason for disconnection between the access point and the client station; and determining the reason for disconnection is related to inactivity based on the reason code.

In Example 9, the subject matter of Examples 1-8 including causing transmission of an outbound keep-alive frame to the access point after the client station time interval having elapsed; receiving an acknowledge frame from the access point after the causing transmission of the outbound keep-alive frame; and determining the finalized client station time interval remains to be determined.

Example 10 is a computer apparatus comprising means to implement of any of Examples 1-9.

Example 11 is a non-transitory computer-readable storage medium including instructions that when executed by a computer, cause the computer to implement of any of Examples 1-9.

Glossary

"Access point" refers to an access point that is distinguishable from a new access point. An access point is a networking hardware device that allows wireless devices, such as computers, smartphones, and tablets, to connect to a network using Wi-Fi or other wireless standards. Access points create a wireless local area network (WLAN) by broadcasting a Wi-Fi signal. Devices in the vicinity can detect and join.

"Access point time interval" refers to a predetermined duration set by the access point's manufacturer. An access point interval of an access point dictates the frequency at which the access point initiates keep-alive procedures with devices connected to the network. In other words, the access point would initiate keep-alive procedures in response to the access point time interval having elapsed. The purpose of these keep-alive processes is to maintain active and stable connections between the access point and the devices, "Acknowledge frame" refers to a short control frame sent by a receiving device to confirm that it has successfully received a data or management frame. Acknowledge frame may be referred to as "ack frame."

"Active" refers to a status of a device. When a device is currently connected to a network, has established a connection with an access point or another device, and ready to send or receive data to/from another device, the status of the device is active. When the status of the device is active, the device may be deemed active.

"Approximation" refers to a value or representation that is close to, but not necessarily equal to, a specific quantity. Approximations are often used in mathematics, science, and engineering when exact values are difficult or impractical to obtain. They provide a simplified, yet reasonably accurate, estimate of a particular value or result, allowing for easier analysis and understanding.

"Broadcast" refers to a method of transmitting data to all devices connected to a network. When a device sends a broadcast message, it is transmitted to every device within the broadcast domain. Typically, a broadcast is used to send information that is relevant or useful to all devices on the network. For example, a router may send a broadcast message to announce its presence on the network.

"Client station" refers to a device that connects to a network, typically through an access point, to communicate and exchange data with other devices within the network. Client stations can include a variety of devices such as smartphones, laptops, tablets, smart TVs, and Internet-of-Things (IoT) devices.

"Client station time interval" refers to a duration that may be dynamically adjusted by the client station to adapt to access point time intervals (e.g., the access point time interval). The client station time interval dictates the frequency at which the client station initiates keep-alive procedures with the access point or other devices. In other words, the client station would initiate keep-alive procedures in response to the client station time interval having elapsed. The purpose of these keep-alive processes is to maintain active and stable connections between the access point and the client stations.

"Communication" refers to the exchange of data or information between devices using wireless signals. Wi-Fi communication enables devices to connect to the internet, share data, and interact with each other without the need for wired connections.

"Data" refers to digital information transmitted between devices. Data can include text, images, audio, video, or other types of content, and may be encoded and divided into packets for efficient transmission and reception.

"Deauth frame" refers to a type of management frame in Wi-Fi communication, specifically defined by the IEEE 802.11 standard. Its primary function is to terminate an established connection between a client device (such as a smartphone, laptop, or tablet) and an access point (AP) or between two client devices in a network. Deauth frames serve as a notification that the connection is being terminated, and the receiving device should no longer consider itself connected or authenticated to the network. Deauth frames can be sent by either the client device or the access point, depending on the circumstances leading to the termination of the connection. Common reasons for sending a deauth frame include the expiration of the authentication, inactivity, network capacity limitations, or the user manually disconnecting from the network.

"Devices" refers to electronic equipment that can connect to a wireless network, such as smartphones, laptops, tablets, smart TVs, and IoT (Internet of Things) gadgets. These devices are equipped with Wi-Fi capabilities, enabling them to send and receive data wirelessly.

"Duration" refers to the predetermined length or period of time for which the timer is set to run. Once activated, the timer will count down (or up) to measure the passage of time, and when the set duration has been reached, the timer may trigger an event, alarm, or notification to signal the end of the allotted time. Duration represents the amount of time the timer is intended to measure or monitor before completing its function. "Duration" may also refers to the length or span of time between two specific points or events. It is a measure of the elapsed time between a starting point and an ending point, often expressed in units such as seconds, minutes, hours, or even years.

"Elapsed" refers to the amount of time that has passed or been completed in relation to a specific duration. For example, by a time interval has elapsed, it means that the entire duration of the time interval has occurred.

"Expiration" refers to a completion of a specified duration, similar to the concept of elapse. In the context of an expiration of a time interval, it indicates that the entire duration of the time interval has occurred.

"Finalize" refers to causing the status or state of a client station time interval to be finalized. In one example, finalizing the client station time interval means to determine the finalized client station time interval of the client station time interval in response to certain conditions.

"Finalized" refers to the status or state of the client station time interval. The client station time interval is finalized if the client station time interval has a finalized client station time interval that is a close approximation of the access point time interval. The client station time interval may be unfinalized, when the client station is connected with a new access point, the client station time interval needs to be re-determined to approximate the access point time interval associated with the new access point.

"Finalized client station time interval" refers to a value of the client station time interval. The finalized client station time interval of the client station time interval is a close approximation of the access point time interval. In one example, the finalized client station time interval is deemed a close approximation of the access point time interval when the finalized client station time interval is less than or equal to one increment shorter than the access point time interval (i.e., access point time interval−increment≤finalized client station time interval≤access point time interval). The finalized client station time interval may be re-determined when the client station is connected to a new access point.

"Flag" refers to a binary indicator or Boolean variable used to represent the state, status, or presence of a particular condition or event in a value, variable, system or process. Flags act as simple markers or switches, typically having two possible values: true (1) or false (0). In one example, a client station time interval has two states: finalized and not-finalized. By flagging the client station time interval finalized, it means using a flag to indicate that the finalized status of the client station time interval.

"Frame" refers to structured units of data that are transmitted wirelessly between devices using radio frequency signals, and frames follow a format defined by the IEEE 802.11 standard. Example frames in a Wi-Fi network include: deauth frames, acknowledge frame, null frame, etc.

"Hardware processor" refers to any circuit that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Inbound keep-alive frame" refers to a keep-alive frame that is sent from the access point to the client station. "Inbound" emphasizes the direction of the frame, indicating that it originates from the access point and is directed towards the client station.

"Increment" refers to a time value that may be added to the client station time interval to adjust the duration of the client station time interval during an iterative cycle to gradually approach a access point time interval. The increment represents a step or a small increase in time value.

"Initialize" refers to the process of setting initial values for an object, variable, or system before it is used or operated.

"Keep-alive frame" refers to a type of frame to be sent to inform the receiving device that the connection is still active, even if there is no data to be transmitted. In one example, the keep-alive frame may be a null frame in the IEEE 802.11 Wi-Fi standard, designed to serve purposes such as maintain a connection or performing power management. In one example, the client station receives the keep-alive frame from the access point to ensure that a connection between the client station 104 and the access point remains active and does not drop due to inactivity.

"Link" refers to the wireless connection established between two devices or between a device and an access point. The link enables the transmission of data and communication between the connected entities.

"Media access control (MAC) address" refers to the Media Access Control address (MAC address) of an access point. MAC address is a unique identifier assigned to an access point for use as a network address in communications within a network. Access points and other devices within a network use this MAC address to direct data packets to their intended destination.

"Media access control address" refers to the Media Access Control address (MAC address) of the access point. MAC address is a unique identifier assigned to an access point for use as a network address in communications within a network. A MAC address usually represented as a string of six groups of two hexadecimal digits separated by colons, such as 00:1A:2B:3C:4D:5E. The first three groups of digits identify the manufacturer of the device, and the last three groups identify the specific device.

"Multicast" refers to a method of transmitting data to a specific group of devices within a network. In multicast communication, a single sender transmits data to multiple recipients who have expressed interest in receiving that data.

"New access point" refers to an access point that is distinguishable from the access point that the client station is originally connected to.

"Outbound keep-alive frame" refers to a keep-alive frame that is sent from the client station to the access point. "Outbound" emphasizes the direction of the frame, indicating that it originates from the client station and is directed towards the access point.

"Previous client station time interval" refers to an earlier instance of the client station time interval. In an iterative process, a new instance of the client station time interval may be determined, creating a series of client station time intervals. The previous client station time interval is used when discussing a current or ongoing iterative cycle to indicate the client station time interval immediately preceded the new or current instance.

"Previous iterative cycle" refers to the earlier occurrence of a repetitive process or series of steps in a method. In the context of iterative cycles, a sequence of operations is executed multiple times, with the output or result of one cycle being used as input for the next cycle. The term "previous iterative cycle" is used when discussing a current or ongoing cycle to indicate the one that immediately preceded it.

"Reason code" refers to a field within a deauthentication (deauth) frame. Reason codes indicate the reason for the termination of an established connection between devices in a Wi-Fi network. The reason code is a numeric value, defined by the IEEE 802.11 standard, that corresponds to a specific reason for the disconnection. Some common reason codes in deauth frame include: disassociated due to inactivity.

"Reset" refers to the process of returning a time value or a counter to its initial or newly adjusted value, often used to restart a timing mechanism. By resetting a time interval, the system or process can begin a new cycle or iteration, starting from the beginning of a specified duration. This action is commonly employed in repetitive or periodic systems and iterative processes.

"Second access point time interval" refers to a predetermined duration set by the new access point's manufacturer. An access point interval of an access point dictates the frequency at which the access point initiates keep-alive procedures with devices connected to the network. In other words, the access point would initiate keep-alive procedures in response to the access point time interval having elapsed. The purpose of these keep-alive processes is to maintain active and stable connections between the access point and the devices.

"Subsequent inbound keep-alive frame" refers to an inbound keep-alive frame that is transmitted following an inbound keep-alive frame transmitted previously or transmitted in the previous iterative cycle.

"Subsequent outbound keep-alive frame" refers to an outbound keep-alive frame that is transmitted following an outbound keep-alive frame transmitted previously or transmitted in the previous iterative cycle.

"Time value" refers to a numerical representation or a set of numerical values that express a duration, a specific point in time, or an elapsed period. For instance, a time value such as 01:23:45 signifies a duration of one hour, 23 minutes, and 45 seconds. In another example, the time value 19:28:37 corresponds to a specific point in time, 7:28:37 PM in the 12-hour format.

"To be determined" refers to a status of a variable (e.g., client station time interval). When the status of the variable is to be determined, it means that the value of the variable has not been finalized and is still under evaluation and subject to change. "To be determined" can be interpreted as the opposite of "finalized," which suggests that the value or outcome of the variable has been decided.

"Unicast communication" refers to a direct exchange of information between two specific devices on the network. Data packets are transmitted from a single sender to a single receiver, ensuring that the communication is exclusive to the two participating devices. Unicast communication is distinct from multicast or broadcast communication, as it does not involve sending data to multiple recipients or all devices on the network simultaneously.

What is claimed is:

1. A method, comprising:

establishing, by at least one hardware processor, a link with an access point;

initializing, by the at least one hardware processor, a client station time interval and an increment;

iteratively adding, by the at least one hardware processor, the increment to the client station time interval until a finalized client station time interval is determined; and causing transmission, by the at least one hardware processor, of an outbound keep-alive frame to the access point in response to the finalized client station time interval having elapsed to maintain a connection to the access point;

wherein the iteratively adding, by the at least one hardware processor, the increment to the client station time interval until the finalized client station time interval is determined, comprises:

receiving a first frame from the access point between a previous client station time interval and the client station time interval;

determining a reason code associated with the first frame, the reason code indicates a reason for disconnection between the access point and the client station; and determining a finalized client station time interval in response to both receiving the first frame from the access point between the previous client station time interval and the client station time interval and determining that the reason for the disconnection being related to inactivity.

2. The method of claim 1, wherein the iteratively adding, by the at least one hardware processor, the increment to the client station time interval until the finalized client station time interval is determined, comprises:

receiving an inbound keep-alive frame from the access point between a previous client station time interval and the client station time interval, wherein the previous client station time interval is equal to the client station time interval minus the increment;

determining the finalized client station time interval in response to receiving the inbound keep-alive frame from the access point between the previous client station time interval and the client station time interval; and determining the finalized client station time interval to be the previous client station time interval.

3. The method of claim 2, further comprising:

receiving a subsequent inbound keep-alive frame from the access point; and confirming an access point time interval being longer than the previous client station time interval but shorter than the client station time interval based on receiving the subsequent inbound keep-alive frame from the access point between the previous client station time interval and the client station time interval.

4. The method of claim 1, further comprising:

determining a media access control address of the access point;

determining a media access control address associated with the first frame in response to receiving the first frame between the previous client station time interval and the client station time interval;

comparing the media access control address of the access point and the media access control address associated with the first frame; and based on the media access control address matches with the media access control address associated with the first frame, determining the first frame is sent by the access point.

5. The method of claim 1, further comprising:

determining a media access control address of the access point;

determining a media access control address associated with the first frame in response to receiving the first frame between the previous client station time interval and the client station time interval;

comparing the media access control address of the access point and the media access control address associated with the first frame;

determining the first frame being sent by a new access point, the new access point is different from the access point based on the media access control address is different from the media access control address associated with the first frame;

recording the media access control address associated with the first frame as the media access control address of the new access point; and performing the determining the client station time interval, iteratively determining, iteratively adding, and determining the finalized client station time interval recited in claim 1 for the new access point.

6. The method of claim 1, wherein the iteratively adding, by the at least one hardware processor, the increment to the client station time interval until the finalized client station time interval is determined, comprises:

causing transmission of an outbound keep-alive frame to the access point after the client station time interval having elapsed;

receiving a first frame from the access point after the causing transmission of the outbound keep-alive frame but before a previous client station time interval elapses;

determining the access point time interval being shorter than the previous client station time interval based on receiving the first frame from the access point before the previous client station time interval; and determining the finalized client station time interval to be the previous client station time interval minus the increment.

7. The method of claim 6, further comprising:

determining a reason code associated with the first frame, the reason code indicates a reason for disconnection between the access point and the client station; and determining the reason for disconnection is related to inactivity based on the reason code.

8. The method of claim 1, wherein the iteratively adding, by the at least one hardware processor, the increment to the client station time interval until the finalized client station time interval is determined, further comprising:

causing transmission of an outbound keep-alive frame to the access point after the client station time interval having elapsed;

receiving an acknowledge frame from the access point after the causing transmission of the outbound keep-alive frame; and determining the finalized client station time interval remains to be determined.

9. A computing apparatus comprising:

a processor; and a memory storing instructions that, when executed by the processor, configure the apparatus to:

establish, by at least one hardware processor, a link with an access point;

initialize, by the at least one hardware processor, a client station time interval and an increment;

iteratively add, by the at least one hardware processor, the increment to the client station time interval until a finalized client station time interval is determined; and cause transmission, by the at least one hardware processor, of an outbound keep-alive frame to the access point in response to the finalized client station time interval having elapsed to maintain a connection to the access point;

wherein the iteratively adding, by the at least one hardware processor, the increment to the client station time interval until the finalized client station time interval is determined, comprises:

receiving a first frame from the access point between a previous client station time interval and the client station time interval;

determining a reason code associated with the first frame, the reason code indicates a reason for disconnection between the access point and the client station; and determining a finalized client station time interval in response to both receiving the first frame from the access point between the previous client station time interval and the client station time interval and determining that the reason for the disconnection being related to inactivity.

10. The computing apparatus of claim 9, wherein the iteratively add, by the at least one hardware processor, the increment to the client station time interval until the finalized client station time interval is determined, comprises:

receive an inbound keep-alive frame from the access point between a previous client station time interval and the client station time interval, wherein the previous client station time interval is equal to the client station time interval minus the increment;

determine the finalized client station time interval in response to receiving the inbound keep-alive frame from the access point between the previous client station time interval and the client station time interval; and determine the finalized client station time interval to be the previous client station time interval.

11. The computing apparatus of claim 10, wherein the instructions further configure the apparatus to:

receive a subsequent inbound keep-alive frame from the access point; and confirm an access point time interval being longer than the previous client station time interval but shorter than the client station time interval based on receiving the subsequent inbound keep-alive frame from the access point between the previous client station time interval and the client station time interval.

12. The computing apparatus of claim 10, wherein the instructions further configure the apparatus to:

determine a media access control address of the access point;

determine a media access control address associated with the first frame in response to receiving the first frame between the previous client station time interval and the client station time interval;

compare the media access control address of the access point and the media access control address associated with the first frame; and based on the media access control address matches with the media access control address associated with the first frame, determine the first frame is sent by the access point.

13. The computing apparatus of claim 10, wherein the instructions further configure the apparatus to:

determine a media access control address of the access point;

determine a media access control address associated with the first frame in response to receiving the first frame between the previous client station time interval and the client station time interval;

compare the media access control address of the access point and the media access control address associated with the first frame;

determine the first frame being sent by a new access point, the new access point is different from the access point based on the media access control address is different from the media access control address associated with the first frame;

record the media access control address associated with the first frame as the media access control address of the new access point; and perform the determining the client station time interval, iteratively determining, iteratively adding, and determining the finalized client station time interval recited in claim 10 for the new access point.

14. The computing apparatus of claim 9, wherein the iteratively add, by the at least one hardware processor, the increment to the client station time interval until the finalized client station time interval is determined, comprises:

cause transmission of an outbound keep-alive frame to the access point after the client station time interval having elapsed;

receive a first frame from the access point after the causing transmission of the outbound keep-alive frame but before a previous client station time interval elapses;

determine the access point time interval being shorter than the previous client station time interval based on receiving the first frame from the access point before the previous client station time interval; and determine the finalized client station time interval to be the previous client station time interval minus the increment.

15. The computing apparatus of claim 14, wherein the instructions further configure the apparatus to:

determine a reason code associated with the first frame, the reason code indicates a reason for disconnection between the access point and the client station; and determine the reason for disconnection is related to inactivity based on the reason code.

16. The computing apparatus of claim 9, wherein the iteratively add, by the at least one hardware processor, the increment to the client station time interval until the finalized client station time interval is determined, wherein the instructions further configure the apparatus to:

cause transmission of an outbound keep-alive frame to the access point after the client station time interval having elapsed;

receive an acknowledge frame from the access point after the causing transmission of the outbound keep-alive frame; and determine the finalized client station time interval remains to be determined.

17. A non-transitory computer-readable storage medium, the computer-readable storage medium including instructions that when executed by a computer, cause the computer to:

establish, by at least one hardware processor, a link with an access point;

initialize, by the at least one hardware processor, a client station time interval and an increment;

iteratively add, by the at least one hardware processor, the increment to the client station time interval until a finalized client station time interval is determined; and cause transmission, by the at least one hardware processor, of an outbound keep-alive frame to the access point in response to the finalized client station time interval having elapsed to maintain a connection to the access point;

wherein the iteratively adding, by the at least one hardware processor, the increment to the client station time interval until the finalized client station time interval is determined, comprises:

receiving a first frame from the access point between a previous client station time interval and the client station time interval;

determining a reason code associated with the first frame, the reason code indicates a reason for disconnection between the access point and the client station; and determining a finalized client station time interval in response to both receiving the first frame from the access point between the previous client station time interval and the client station time interval and determining that the reason for the disconnection being related to inactivity.

18. The computer-readable storage medium of claim 17, wherein the iteratively add, by the at least one hardware processor, the increment to the client station time interval until the finalized client station time interval is determined, comprises:

receive an inbound keep-alive frame from the access point between a previous client station time interval and the client station time interval, wherein the previous client station time interval is equal to the client station time interval minus the increment;

determine the finalized client station time interval in response to receiving the inbound keep-alive frame from the access point between the previous client station time interval and the client station time interval; and determine the finalized client station time interval to be the previous client station time interval.

* * * * *